United States Patent [19]
Perez Corbalan

[11] Patent Number: 5,738,332
[45] Date of Patent: Apr. 14, 1998

[54] FLOW VALVE OPERATED BY FLOW TRANSFER MEANS WHICH REGULATE SMALL FLOWS OF CONTROL

[76] Inventor: Sergio Perez Corbalan, Estado 235, of 511, Santiago, Chile

[21] Appl. No.: 545,890

[22] Filed: Oct. 20, 1995

[51] Int. Cl.$^6$ .................................................. F16K 31/12
[52] U.S. Cl. ........................ 251/45; 251/30.02; 251/46
[58] Field of Search ............................ 251/45, 46, 33, 251/30.02

[56] References Cited

U.S. PATENT DOCUMENTS

| | | |
|---|---|---|
| 2,980,385 | 4/1961 | Hunter et al. . |
| 3,493,008 | 2/1970 | Scaglione ........................ 251/46 |
| 4,488,702 | 12/1984 | Lapeyre ........................... 251/46 |
| 4,911,401 | 3/1990 | Holcomb et al. ............... 251/45 |

*Primary Examiner*—A. Michael Chambers
*Attorney, Agent, or Firm*—Shlesinger Arkwright & Garvey LLP

[57] ABSTRACT

A flow valve operating by pressure differentials and by flow transfer means which regulate small flows of control. This valve is sensitive to small changes of pressure and resistant to great working pressures, having few components of a simple design. The valve of the invention basically consists in a rigid valve body with an opening for flow inlet and one opening for flow outlet, which are oriented in a substantially cross way to said flow opening. The body of the valve has a main cavity between the flow inlet and the flow outlet. A valve seat is in the limit of the main cavity and the flow inlet. In addition, the valve body has pipes for the inlet of the control flow and for the outlet of the control flow, which are associated with the flow transfer means for the control of the valve. The valve also has an elastomeric body in charge of regulating the flow of it, by opening or closing it, depending on the difference of pressures produced between the walls, which are modified by the flow transfer means for the control flow. The elastomeric body is located inside the main cavity of the valve, the same being hollow and open in one of its axial ends and has a central hole in the other end. This elastomeric body is at least made up of two coaxial zones: one sealing zone and a second zone of radial seal. Eventually, a third intermediate zone or a zone of thin wall. These zones of the elastomeric body meet specific functions during the operation of the valve, thus avoiding the participation of the separate components which make the design complex and increase the manufacture cost.

32 Claims, 4 Drawing Sheets

FLOW VALVE OPERATED BY FLOW TRANSFER MEANS WHICH REGULATE SMALL FLOWS OF CONTROL

BACKGROUND OF THE INVENTION

1. Field of the Invention

The invention is concerned with flow valves operated by flow transfer means which regulate small flows of control, operating by pressure differentials.

2. Description of the Related Art

A great variety of flow valves is known which are commanded by pressure differences.

U.S. Pat. No. 2,980,385 of E. J. Hunter et al. discloses a valve which has a substantially hemispherical yieldable membrane, which walls shall be relatively thick, so that this membrane does not become locked at the flow outlets when pressures are very high in its concave portion. The excess thickness of the walls, on the contrary, prevents that the valve reacts before small pressure differentials, the valve being thus able to be permanently closed or being able to release a very small stream of flow, without releasing the required flow when a small opening of the valve is commanded.

U.S. Pat. No. 3,493,008 of P. J. Scaglione discloses a valve with an active element of valve made up of a disc cup and a metallic hermetically sealed, flexible type bellow. The walls of the metallic, flexible bellow are subject to the pressure differences on both sides of their faces, being able to become deformed if the internal pressure is higher than the external one, this forcing the design of a bellow with more resistant walls when operating at high pressures, thus a low sensitivity valve being obtained before small variations of pressure. On the other hand, the disc cup is basically rigid and its seal looses effectiveness with the valve seat when the flow of the line carries impurities. In addition, due to the structure of the valve, a substantial loss of load is produced.

The state of the art valves which act by pressure differentials are complex as regards their structure with a great loss of load and they have little versatility with respect to the flow pressures in the line, that is to say, these valves must be designed in such a way to control the flows which are in a rather close range of pressures and loose their efficiency before great changes of pressure in the line.

SUMMARY OF THE INVENTION

The invention, on the contrary, offers a valve of the differential type which is sensitive to small changes of pressure and resistant to great working pressures. The valves of the invention, on the other hand, result from a very simple design and with little components, thus making the manufacture of small size valves possible.

The valves of the invention basically consist in a rigid valve body with an opening for flow inlet and one flow outlet, which are oriented in a substantially cross way each other. At the lower end of the flow inlet there is a valve seat, and between the inlet and outlet of flow, the body of the valve has a constant-section main cavity, cylindrical preferably, which is coaxially oriented to the flow inlet, this main cavity having a ring-shaped broadening in the zone communicating with the flow outlet over the valve seat. On the other hand, the main cavity of the valve body is communicated in its farthest zone of the flow inlet with an inlet of control flow. Additionally, the flow outlet is communicated with one or more outlets of the control flow.

These inlets and outlets of the control flow are associated with control flow transfer means, which regulate small flows of control, these transfer means of the control flow being those which are commanded (manually or automatically, directly or remotely) to open, close or define a predetermined opening condition of the valve.

The most outstanding features of the invention are obtained thanks to an elastomeric body located inside the main cavity of the valve body, which is at least made up of two coaxial zones: one first sealing zone and a second zone of radial seal, being able to have an intermediate zone or a thin wall zone.

The sealing zone is located at the lower base of the elastomeric body and is formed by a relatively thick mass body with a slightly lower section than the section of the main cavity and with a slightly greater height than the ring-shaped broadening height of the main cavity, so that this sealing zone does not significantly collapse in the axial direction before the working pressures. The base of the sealing zone has a central hole allowing the transfer of flow from the inlet of the flow to the main cavity and vice versa. The lower surface of the sealing zone has a slightly greater section than the section of the valve seat and the upper surface of said zone has a section which is equal to or greater than its lower surface.

The radial seal zone of the elastomeric body is located on the opposite end to that of the sealing zone and acts on the side walls of the main cavity. This radial seal zone is made up of relatively thick portions of wall which external surface is of a geometry which is similar to that of the surface of the main cavity in that sector and its section is tight to the section of said main cavity.

The valve of the invention may have whether an intermediate zone or a thin wall zone defining a mantle between the sealing zone and the radial seal zone; or else it may have a compressing spring located in the main cavity of the valve body, which exercises an axial force on the sealing zone which tends to keep it in contact with the valve seat. The valves of the invention may also jointly show the wall zone of the elastomeric body and the compressing ring.

The elastomeric body of the valves of the invention has been designed as a mono-block and its geometry is variable depending on the function performed by each section of it (sealing zone, radial seal zone, and, eventually, the wall zone). In this way, and unlike the valves of the state of the art, the modification of a dimensional parameter in the active element of the valve in order to meet a certain requirement of the flow line, does not affect other operating parameters. For example, if you are working with high pressures, the valve may be designed with a stronger sealing zone, but a thin wall zone may be kept which is not affected by the excess pressures, because, as discussed below, this zone of thin wall becomes protected by the walls of the main cavity of the valve body. In this example, the valve obtained behaves well under high pressures without loosing sensitivity before a decrease of pressure in the line.

BRIEF DESCRIPTION OF DRAWINGS

Below, a detailed description of the invention is disclosed based on the drawings, where.

DETAILED DESCRIPTION OF INVENTION

Figure 1:
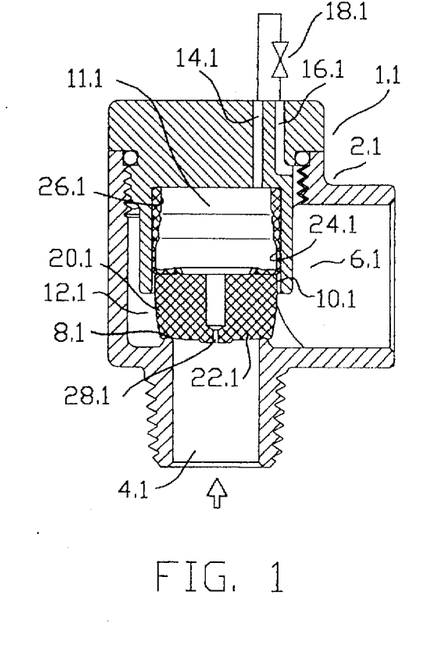
FIG. 1 shows a sectional elevational view of a first modality of the valve of the invention, in which it is closed.
Figure 2:
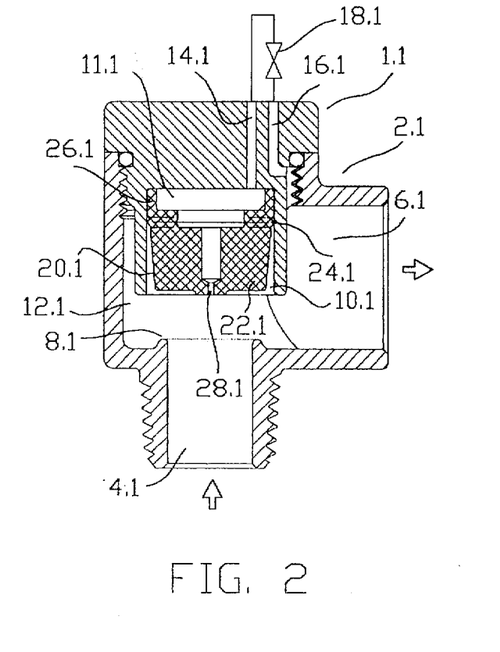
FIG. 2 is the same view as FIG. 1, but showing the valve opened.

FIGS. 1 and 2 show a first modality of the invention in closed and opened position, respectively. Valve 1.1 is made up of a valve body 2.1 having an opening for the flow inlet 4.1 and a flow outlet 6.1 oriented in a substantially cross way to said flow inlet 4.1.

The valve body 2.1 has a valve seat 8.1 inside said flow inlet 4.1. Between the flow inlet 4.1 and the flow outlet 6.1, the valve body 2.1 has a main cavity 10.1 of constant section, cylindrical preferably, which is coaxially oriented to the flow inlet 4.1. This main cavity 10.1 has a ring-shaped broadening 12.1 in the zone which communicates with the flow outlet 6.1 over valve seat 8.1. On the other hand, the main cavity 10.1 is communicated in its farthest zone to the flow outlet 4.1 with an inlet of the control flow 14.1.

Additionally, the flow outlet 6.1 is communicated with one or more outlets of the control flow 16.1.

The valve of this first modality has the flow transfer means which regulate small flows of control. These flow transfer means consist in a secondary or control valve 18.1 installed between the inlet of the control flow 14.1 and the outlet of the control flow 16.1. The secondary or control valve 18.1 may be any valve of the state of the art allowing a preset regulation of the flow between a minimum closed position and a preset maximum position (open).

In addition, the valve 1.1 includes an elastomeric body 20.1 with a constant cross section, cylindrical preferably, which is hollow and open in its upper base, the same being located inside the main cavity 10.1, so that it is lightly compressed in the axial direction in order to exert a force on the valve seat 8.1. This elastomeric body 20.1 is made up of three coaxial zones: a first sealing zone 22.1, a second zone of wall 24.1 and a third zone of radial zone 26.1.

The sealing zone 22.1 is located at the lower base of the elastomeric body 20.1 and is formed by a relatively thick mass body with a slightly lower section than the section of the main cavity 10.1 and with a slightly greater height than the ring-shaped broadening height 12.1 of said main cavity 10.1, so that this sealing zone 22.1 does not significantly collapse in the axial direction before the working pressures. The base of the sealing zone 22.1 has a central hole 28.1 allowing the transfer of flow from the inlet of the flow 4.1 to the main cavity 10.1 and vice versa. The lower surface of the sealing zone 22.1 has a slightly greater section than the section of the valve seat 8.1 and the upper surface of said zone has a section which is equal to or greater than its lower surface.

The wall zone 24.1 is located in the intermediate section of the mantle of the elastomeric body 20.1 and is made up of a portion of wall which is relatively thin and its section is inferior to the section of the main cavity 10.1, this portion of the wall being liable to become buckled and transmit axial stresses before the pressures exercised inside said main cavity 10.1.

The zone of radial seal 26.1 acts on the side walls of the main cavity 10.1 and is forming the section of the open upper base of the elastomeric body 20.1. This zone of radial seal 26.1 is formed by portions of wall of a greater thickness than that of the zone of wall 24.1, which external surface has a similar geometry to that of the surface of the main cavity 10.1 in that sector, and its section is tight to the section of said main cavity 10.1.

Although in this modality, the end of the zone of radial seal 26.1 of the elastomeric body 20.1 is free to displace in the axial direction of said main cavity, also a variant of the valve may be considered in which said end of the zone of radial seal 26.1 is anchored to the wall of the main cavity 10.1 of the valve body 2.1, by means of a ring-shaped projection, for example, in the external wall of said zone of radial seal 26.1 which is held back in a corresponding ring-shaped recess of said main cavity 10.1.

FIG. 1 shows valve 1.1 in a closed condition. In this condition, when housing the elastomeric body 20.1, the main cavity 10.1 is covered by the wall zone 24.1 of it, forming a chamber 11.1 and a sealing is formed in the valve seat 8.1 through the sealing zone 22.1 of said elastomeric body 20.1, initially due to the axial compression exercised by the walls of the mantle of it (wall zone 24.1), because of its dimensional excess in the axial direction with respect to the height of the main cavity 10.1.

When valve 1.1 is closed and the flow floods the inlet opening of the flow 4.1, the latter enters through the central hole 28.1 of the elastomeric body 20.1, the latter also flooding the chamber 11.1, and because the section of said chamber 11.1 is greater than the section of the valve seat 8.1, the pressure of the flow exerts a resulting force which compresses the sealing zone 22.1 of the elastomeric body 20.1 against the valve seat 8.1, the sealing of the valve being thus increased. The flow also floods the inlet of the control flow 14.1 which tops out in the secondary or control valve 18.1, which, in this condition, is closed.

When the secondary or control valve 18.1 is opened, the flow which is held back by pressure in chamber 11.1 is discharged through the inlet of the control flow 14.1 going through said control valve 18.1 in order to be released through the outlet of the control flow 16.1 to the outlet opening of flow 6.1 due to the differences of pressure existing between chamber 11.1 and the outlet opening of flow 6.1. During this process of flow discharge from chamber 11.1, the pressure in said chamber is lower than the pressure in the inlet opening of flow 4.1, so that the flow found in said inlet 4.1 moves through the central hole 28.1 of the elastomeric body 20.1 to enter chamber 11.1, but this entry of flow does not get to increase the pressure in said chamber, since the control valve 18.1 is opened releasing the flow, and in this first moment the thin walls of the elastomeric body 20.1 tend to recover their initial height. However, the greater pressure of the flow in the external face of the sealing zone 22.1 of the elastomeric body 20.1—which is exerted from the flow inlet opening 4.1—produces a resulting axial force which displaces the sealing zone 22.1, moving it away from the valve seat 8.1, the wall zone 24.1 being collapsed, which is left exercising a greater restoring force in axial direction, which tends to overcome the force exerted by the flow pressure entering from the opening of the flow inlet 4.1. In this situation, with the elastomeric body 20.1 partially collapsed and far from the valve seat 8.1, the flow is able now to freely move from the inlet opening of flow 4.1 to the outlet opening of the flow 6.1 as depicted in FIG. 2.

In FIG. 2 valve 1.1 of the first modality of the invention is shown in open condition. In this condition, the chamber 11.1 has decreased its volume due to the collapsing of the wall zone 24.1. Depending on the flow which is transferred by the control valve 18.1, the pressure in the chamber 11.1 may change, and with this, the separation between the sealing zone 22.1 and the valve seat 8.1 may also vary, thus varying the opening and closing degree of the valve 1.1. This allows to command the opening, closing and adjustment of the valve with greater accuracy and lesser energy.

When the control valve 18.1 is totally or partially closed, a greater quantity of flow begins to enter from the flow inlet opening 4.1 through the central hole 28.1 to the chamber 11.1, this increasing its volume of flow and lowering the sealing zone 22.1 moving the same closer to the valve seat 8.1, thus reducing the section of free passage of flow from the inlet opening of flow 4.1 to the outlet opening of flow 6.1 until closing, if the control valve 18.1 is commanded to close.

Figure 3:
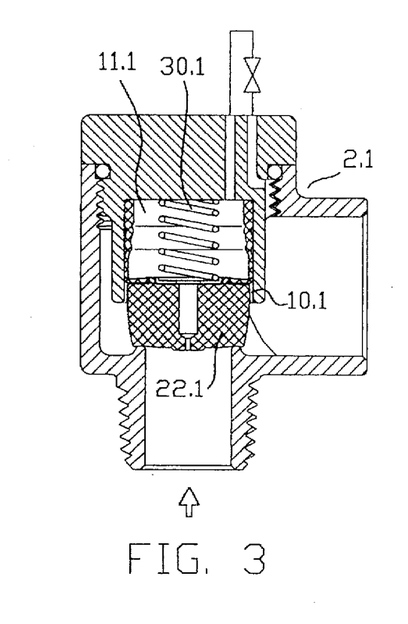
FIG. 3 shows a sectional elevational view of a second modality of the valve of the invention, in which it is closed.
Figure 4:
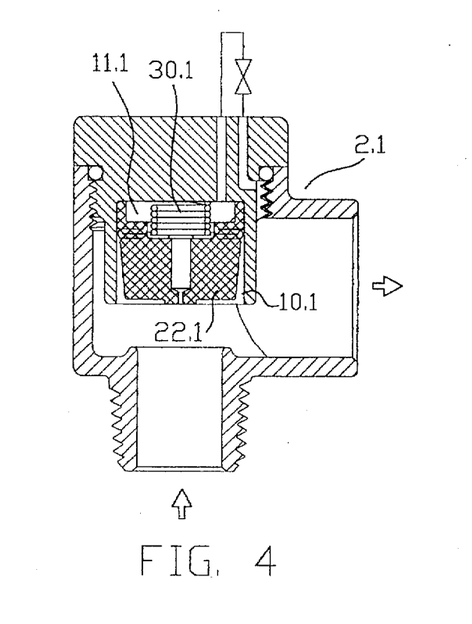
FIG. 4 is the same view as FIG. 3, but showing the valve opened.

FIGS. 3 and 4 depict a second modality of the invention in closed and open position, respectively. This modality is a variant of the first modality depicted in FIGS. 1 and 2, but a compressing spring 30.1 has been included inside the chamber 11.1, initially being lightly compressed between the upper surface of the sealing zone 22.1 and the upper surface of the main cavity 10.1 of the valve body 2.1. This compressing spring 30.1 allows the use of the valve in flow networks of greater pressure. The description of the elements and their operation is quite similar to that already explained with respect to the first modality of the invention.

Figure 5:
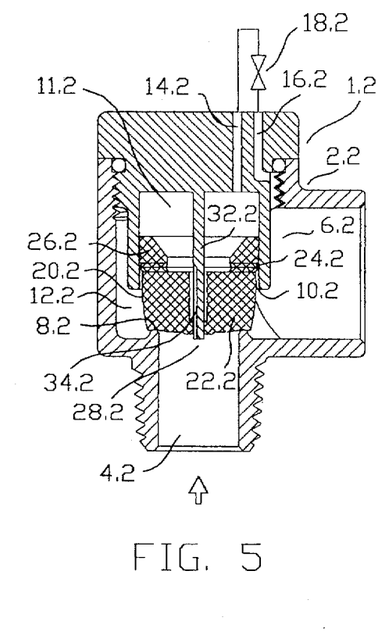
FIG. 5 shows a sectional elevational view of a third modality of the valve of the invention, in which it is closed.
Figure 6:
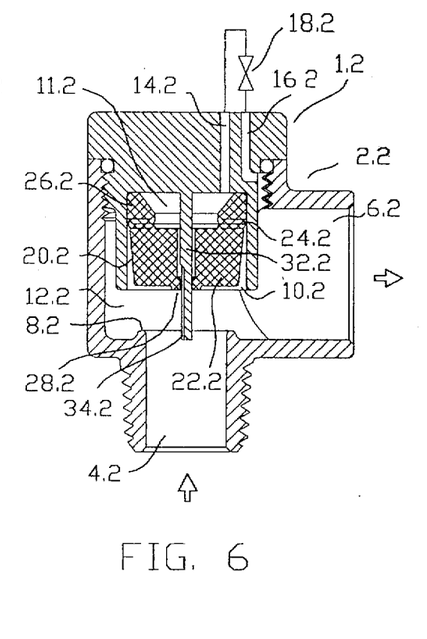
FIG. 6 is the same view as FIG. 5, but showing the valve opened.

The third modality of the valve of the invention is depicted in FIGS. 5 and 6 in closed and open positions, respectively. This modality, unlike the other modalities, is provided with a fixed axial stem—as described below—which serves as guide to the displacement of the elastomeric body and, mainly, produces a self-cleaning effect on the central hole of the sealing zone, thus avoiding the blocking of this hole with impurities that may be carried by the flow of the network.

This third modality consists in a valve 1.2 which is made up of a valve body 2.2 having an inlet opening for the flow 4.2 and a flow outlet 6.2 which is oriented in a substantially cross way to said flow inlet 4.2.

The valve body 2.2 has a valve seat 8.2 inside said flow inlet 4.2. Between the flow inlet 4.2 and the flow outlet 6.2, the valve body 2.2 has a main cavity 10.2 of constant section, cylindrical preferably, which is coaxially oriented to the flow inlet 4.2. This main cavity 10.2 has a ring-shaped broadening 12.2 in the zone which communicates with the flow outlet 6.2 over valve 8.2. On the other hand, the main cavity 10.2 is communicated in its farthest zone to the flow outlet 4.2 with an inlet of the control flow 14.2. Additionally, the flow outlet 6.2 is communicated with one or more outlets of the control flow 16.2.

The valve of this third modality has flow transfer means which regulate small flows of control. These flow transfer means consist in a secondary or control valve 18.2 installed between the inlet of the control flow 14.2 and the outlet of the control flow 16.2. The secondary or control valve 18.2 may be any valve of the state of the art allowing a preset regulation of the flow between a minimum closed position and a preset maximum position (open).

In addition, the valve 1.2 includes an elastomeric body 20.2 with a constant cross section, cylindrical preferably, which is hollow and open in its upper base, the same being located inside the main cavity 10.2, so that it is lightly compressed in the axial direction in order to exert a force on the valve seat 8.2. This elastomeric body 20.2 is made up of three coaxial zones: a first sealing zone 22.2, a second zone of wall 24.2 and a third zone of radial zone 26.2.

The sealing zone 22.2 is located at the lower base of the elastomeric body 20.2 and is formed by a relatively thick mass body with a slightly lower section than the section of the main cavity 10.2 and with a slightly greater height than the ring-shaped broadening height 12.2 of said main cavity 10.2, so that this sealing zone 22.2 does not significantly collapse in the axial direction before the working pressures. The base of the sealing zone 22.2 has a central hole 28.2 allowing the transfer of flow from the inlet of the flow 4.2 to the main cavity 10.2 and vice versa. The lower surface of the sealing zone 22.2 has a slightly greater section than the section of the valve seat 8.2 and the upper surface of said zone has a section which is equal to or greater than its lower surface.

The wall zone 24.2 is located in the intermediate section of the mantle of the elastomeric body 20.2 and is made up of a portion of wall which is relatively thin and its section is inferior to the section of the main cavity 10.2, this portion of the wall being liable to become buckled and transmit axial stresses before the pressures exercised inside said main cavity 10.2.

The zone of radial seal 26.2 acts on the side walls of the main cavity 10.2 and is forming the section of the open upper base of the elastomeric body 20.2. This zone of radial seal 26.2 is formed by portions of wall of a greater thickness than that of the zone of wall 24.2, which external surface has a similar geometry to that of the surface of the main cavity 10.2 in that sector, and its section is tight to the section of said main cavity 10.2.

In this third modality of the invention, the valve body 2.2 has an axial stem 32.2, which is interlocked or anchored to said valve body 2.2. This axial stem 32.2 has a longitudinal groove 34.2 involving at least a section slightly greater than the thickness of the sealing zone 22.2, the axial stem 32.2 tightly going through the central hole 28.2 of the lower base of the elastomeric body 20.2.

Although in this modality, the end of the zone of radial seal 26.2 of the elastomeric body 20.2 is free to displace in the axial direction of said main cavity, also a variant of the valve may be considered in which said end of the zone of radial seal 26.2 is anchored to the wall of the main cavity 10.2 of the valve body 2.2, by means of a ring-shaped projection, for example, in the external wall of said zone of radial seal 26.2 which is held back in a corresponding ring-shaped recess of said main cavity 10.2.

FIG. 5 depicts valve 1.2 in a closed condition and with flow in its inlet line. In an initial and prior condition, when valve 1.2 is installed in the network and the latter has no load of flow, and when housing the elastomeric body 20.2, the main cavity 10.2 is covered by the wall zone 24.2 of it, forming a chamber 11.2 and a sealing is formed in the valve seat 8.2 through the sealing zone 22.2 of said elastomeric body 20.2, initially due to the axial compression exercised by the walls of the mantle of it (wall zone 24.2), because of its dimensional excess in the axial direction with respect to the height of the main cavity 10.2.

When valve 1.2 is closed and the flow floods the inlet opening of the flow 4.2, the latter enters through the central hole 28.2 of the elastomeric body 20.2 and of the longitudinal groove 34.2 of the axial stem 32.2, also flooding the chamber 11.2, and because the section of said chamber 11.2 is greater than the section of the valve seat 8.2, the pressure of the flow exerts a resulting force which compresses the sealing zone 22.2 of the elastomeric body 20.2 against the valve seat 8.2, the sealing of the valve being thus increased. The flow also floods the inlet of the control flow 14.2 which tops out in the secondary or control valve 18.2, which, in this condition, is closed.

If the zone of radial seal 26.2 has an internal trunkconical, ring-shaped wall as depicted in FIGS. 5 and 6, then the pressure inside the chamber 11.2 shall exert a resulting force on this internal ring-shaped wall which shall displace the zone of radial sealing 26.2 downwards, thus compressing the wall zone 24.2.

When the secondary or control valve 18.2 is opened, the flow which is held back by pressure in chamber 11.2 is discharged through the inlet of the control flow 14.2 going through said control valve 18.2 in order to be released through the outlet of the control flow 16.2 to the outlet opening of flow 6.2 due to the existing differences of pressure between chamber 11.2 and the outlet opening of flow 6.2. During this process of flow discharge from chamber 11.2, the pressure in said chamber is lower than the pressure in the inlet opening of flow 4.2, so that the flow found in said inlet 4.2 moves through the central hole 28.2 of the elastomeric body 20.2, and through the longitudinal groove 34.2 of the axial stem 32.2, to enter chamber 11.2, but this entry of flow does not get to increase the pressure in said chamber, since the control valve 18.2 is opened releasing the flow, and in this first moment the thin walls of the elastomeric body 20.2 tend to recover their initial height. However, the greater pressure of the flow in the external face of the sealing zone 22.2 of the elastomeric body 20.2— which is exerted from the flow inlet opening 4.2—produces a resulting axial force which displaces the sealing zone 22.2, moving it away from the valve seat 8.2, the elastomeric body 20.2 being displaced upwards, the latter maintaining its wall zone 24.2 collapsed, exercising a greater restoring force in axial direction, which tends to overcome the force exerted by the flow pressure entering from the opening of the flow inlet 4.2. In this situation, with the elastomeric body 20.2 partially collapsed and far from the valve seat 8.2, the flow is able now to freely move from the inlet opening of flow 4.2 (through the longitudinal groove 34.2) to the outlet opening of the flow 6.2 as depicted in FIG. 6.

In FIG. 6 valve 1.2 of the modality of the invention is depicted in open condition. In this condition, the chamber 11.2 has decreased its volume due to the displacement of the elastomeric body 20.2 (which keeps its wall zone 24.2 collapsed). Depending on the flow which is transferred by the control valve 18.2, the pressure in the chamber 11.2 may change, and with this, the separation between the sealing zone 22.2 and the valve seat 8.2 may also vary, thus varying the opening and closing degree of the valve 1.2. This allows to command the opening, closing and adjustment of the valve with greater accuracy and lesser energy.

When the control valve 18.2 is totally or partially closed, a greater quantity of flow begins to enter from the flow inlet opening 4.2 through the central hole 28.2 and the longitudinal groove 34.2 to the chamber 11.2, this increasing its volume of flow and lowering the sealing zone 22.2 moving the same closer to the valve seat 8.2, thus reducing the section of free passage of flow from the inlet opening of flow 4.2 to the outlet opening of flow 6.2 until closing, if the control valve 18.2 is commanded to close.

Figure 7:
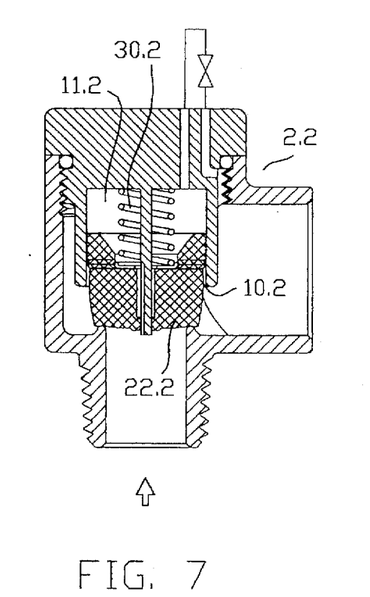
FIG. 7 shows a sectional elevational view of a fourth modality of the valve of the invention, in which it is closed.
Figure 8:
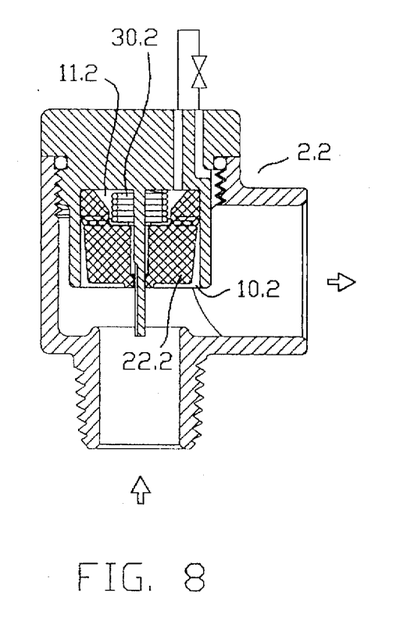
FIG. 8 is the same view as FIG. 7, but showing the valve opened.

FIGS. 7 and 8 depict a fourth modality of the invention in closed and open position, respectively. This modality is a variant of the third modality depicted in FIGS. 5 and 6, but a compressing spring 30.2 has been included inside the chamber 11.2, initially being lightly compressed between the upper surface of the sealing zone 22.2 and the upper surface of the main cavity 10.2 of the valve body 2.2. This compressing spring 30.2 allows the use of the valve in flow networks of greater pressure. The description of the elements and their operation is quite similar to that already explained with respect to the third modality of the invention.

Figure 9:
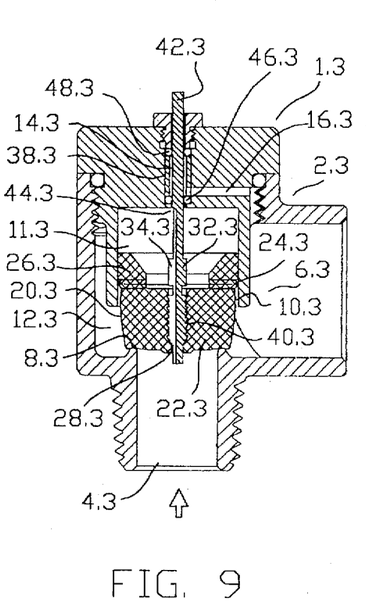
FIG. 9 shows a sectional elevational view of a fifth modality of the valve of the invention, in which it is closed.
Figure 10:
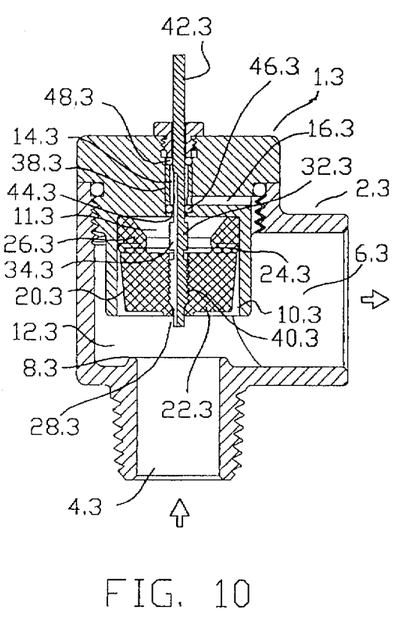
FIG. 10 is the same view as FIG. 9, but showing the valve opened.

The fifth modality of the valve of the invention is depicted in FIGS. 9 and 10 in closed and open positions, respectively. This modality, unlike the other modalities, is provided with a mobile axial stem, provided with a longitudinal groove of constant or variable cross section, which, in combination with a secondary cavity in the valve body, acts as transfer means for the control flow, as described below.

This fifth modality consists in a valve 1.3 which is made up of a valve body 2.3 having an inlet opening for the flow 4.3 and a flow outlet 6.3 which is oriented in a substantially cross way to said flow inlet 4.3.

The valve body 2.3 has a valve seat 8.3 inside said flow inlet 4.3. Between the flow inlet 4.3 and the flow outlet 6.3, the valve body 2.3 has a main cavity 10.3 of constant section, cylindrical preferably, which is coaxially oriented to the flow inlet 4.3. This main cavity 10.3 has a ring-shaped broadening 12.3 in the zone which communicates with the flow outlet 6.3 over valve seat 8.3. On the other hand, the main cavity 10.3 is communicated in its farthest zone to the flow outlet 4.3 with an inlet of the control flow 14.3. Additionally, the flow outlet 6.3 is communicated with one or more outlets of the control flow 16.3.

The valve 1.3 includes an elastomeric body 20.3 with a constant cross section, cylindrical preferably, which is hollow and open in its upper base, the same being located inside the main cavity 10.3, so that it is lightly compressed in the axial direction in order to exert a force on the valve seat 8.3. This elastomeric body 20.3 is made up of three coaxial zones: a first sealing zone 22.3, a second zone of wall 24.3 and a third zone of radial zone 26.3.

The sealing zone 22.3 is located at the lower bottom of the elastomeric body 20.3 and is formed by a relatively thick mass body with a slightly lower section than the section of the main cavity 10.3 and with a slightly greater height than the ring-shaped broadening height 12.3 of said main cavity 10.3, so that this sealing zone 22.3 does not significantly collapse in the axial direction before the working pressures. The base of the sealing zone 22.3 has a central hole 28.3 allowing the transfer of flow from the inlet of the flow 4.3 to the main cavity 10.3 and vice versa. The lower surface of the sealing zone 22.3 has a slightly greater section than the section of the valve seat 8.3 and the upper surface of said zone has a section which is equal to or greater than its lower surface.

The wall zone 24.3 is located in the intermediate section of the mantle of the elastomeric body 20.3 and is made up of a portion of wall which is relatively thin and its section is inferior to the section of the main cavity 10.3, this portion of the wall being liable to become buckled and transmit axial stresses before the pressures exercised inside said main cavity 10.3.

The zone of radial seal 26.3 acts on the side walls of the main cavity 10.3 and is forming the section of the open upper base of the elastomeric body 20.3. This zone of radial seal 26.3 is formed by portions of wall of a greater thickness than that of the zone of wall 24.3, which external surface has a similar geometry to that of the surface of the main cavity 10.3 in that sector, and its section is tight to the section of said main cavity 10.3.

Although in this modality, the end of the zone of radial seal 26.3 of the elastomeric body 20.3 is free to displace in the axial direction of said main cavity, also a variant of the valve may be considered in which said end of the zone of radial seal 26.3 is anchored to the wall of the main cavity 10.3 of the valve body 2.3, by means of a ring-shaped projection, for example, in the external wall of said zone of radial seal 26.3 which is held back in a corresponding ring-shaped recess of said main cavity 10.3.

In this fifth modality of the invention, the valve body 2.3 has an axial stem 32.3 having an anchorage end 40.3 and a driving end 42.3. The anchorage end 40.3 of the axial stem 32.3 is interlocked or anchored to the sealing zone 22.3 of the elastomeric body 20.3. The driving end 42.3 of the axial stem 32.3 goes through the valve body 2.3 by an axial hole 44.3 of the same. Said axial hole 44.3 undergoes a broadening in its recess, thus defining a secondary cavity 38.3 in the valve body 2.3, from which point the outlet or outlets of the control flow 16.3 start. The secondary cavity 38.3 is provided with lower sealing means 46.3 and upper sealing means 48.3 which are tight to the axial stem 32.3.

In addition, the axial stem 32.3 has a longitudinal groove 34.3 extending from the beginning of the anchorage end 40.3 to such a length that, when the elastomeric body 20.3 is compressed against the valve seat 8.3, said groove tops out in a position which is immediately prior to the lower sealing means 46.3 of the secondary cavity 38.3, thus the terminal portion of the driving end 42.3 of the axial stem 32.3 being free of longitudinal groove 34.3. The lower and upper sealing means do not exert any sealing effect on the surface of the longitudinal groove 34.3, which shall only seal the rest of the mantle of the axial stem 32.3 (surface without groove) in the section which is affected by said sealing means. The inlet of control flow 14.3 is facing the longitudinal projection of the longitudinal groove 34.3 of the axial stem 32.3.

The valve has flow transfer means which regulate small control flows. These flow transfer means are made up of the secondary cavity 38.3 itself, the lower seal means 46.3 and the upper ones 48.3, and of the limit portion of the axial stem 32.3, where the longitudinal groove is interrupted 34.3.

FIG. 9 depicts valve 1.3 in a closed condition by the initial application of an external axial force on the driving end 42.3 of the axial stem 32.3 and with flow in its inlet line. In this situation, the anchorage end 40.3 of the axial stem 32.3 compresses the sealing zone 22.3 of the elastomeric body 20.3 against the valve seat 8.3 at the same time as the upper terminal end of the longitudinal groove 34.3 is in a position which is not locked by the lower sealing means 46.3 of the secondary cavity 38.3, so that these sealing means exert their effectively sealing action on the flat walls of the axial stem 32.3.

In an initial and prior condition, when valve 1.3 is installed in the network and the latter has no load of flow, and when housing the elastomeric body 20.3, the main cavity 10.3 is covered by the wall zone 24.3 of it, forming a chamber 11.3 due to the dimensional excess of the elastomeric body 20.3, in the axial direction (excess with respect to the height of the main cavity 10.3).

When valve 1.3 is closed and the flow floods the inlet opening of the flow 4.3, the latter enters through the central hole 28.3 of the elastomeric body 20.3 and of the longitudinal groove 34.3 of the axial stem 32.3, also flooding the chamber 11.3, and because the section of said chamber 11.3 is greater than the section of the valve seat 8.3, the pressure of the flow exerts a resulting force which compresses the sealing zone 22.3 of the elastomeric body 20.3 against the valve seat 8.3, the sealing of the valve being thus increased. The flow also floods the inlet of the control flow 14.3, but the lower sealing means 46.3 prevents the entering of flow to the inside of the secondary cavity 38.3, since the single possible passage of flow is through the longitudinal groove 34.3 of the axial stem 32.3, which, in this condition, is out of the action of the sealing means. Under this condition of closed valve with flow load inside, the valve shall remain closed, although the action of the external force may end on the axial stem 32.3.

If the zone of radial seal 26.3 has an internal trunk-conical, ring-shaped wall as depicted in FIGS. 9 and 10, then the pressure inside the chamber 11.3 shall exert a resulting force on this internal ring-shaped wall which shall displace the zone of radial sealing 26.3 downwards, thus compressing the wall zone 24.3.

When the valve is opened by applying an axial force applied in the driving end 42.3 of the axial stem 32.3, the longitudinal groove can be approached beyond the lower sealing means 46.3, and moves away from the sealing zone 22.3 of the valve seat 8.3. In this condition and due to the differences of pressure existing between chamber 11.3 and the outlet opening of flow 6.3, the flow which is held back by pressure in chamber 11.3 is discharged through the inlet of control flow 14.3 by the longitudinal groove 34.3 in that zone—since the sealing means do not act in the groove—going to the secondary cavity 38.3, and from this the flow is released through the outlet of the control flow 16.3 to the outlet opening of flow 6.3.

Once the opening of the valve 1.3 is started, the external force may be stopped in the driving end 42.3, and it shall continue opened. Indeed, during this process of flow discharge from chamber 11.3, the pressure in said chamber is lower than the pressure in the inlet opening of flow 4.3, so that the flow found in said inlet 4.3 moves through the central hole 28.3 of the elastomeric body 20.3, and through the longitudinal groove 34.3 of the axial stem 32.3 to enter chamber 11.3, but this entry of flow does not get to increase the pressure in said chamber, since the flow continues being released by the secondary cavity 38.3 to the outlet of the control flow 16.3. However, the greater pressure of the flow in the external face of the sealing zone 22.3 of the elastomeric body 20.3—which is exerted from the flow inlet opening 4.3—produces a resulting axial force which displaces the sealing zone 22.3, moving it away from the valve seat 8.3, the elastomeric body 20.3 being displaced upwards, the latter maintaining its wall zone 24.3 collapsed, exercising a greater restoring force in axial direction, which tends to overcome the force exerted by the flow pressure entering from the opening of the flow inlet 4.3. In this situation, with the elastomeric body 20.3 partially collapsed and far from the valve seat 8.3, the flow is able now to freely move from the inlet opening of flow 4.3 (through the longitudinal groove 34.3) to the outlet opening of the flow 6.3 as depicted in FIG. 10.

In FIG. 10 valve 1.3 of the fifth modality of the invention is depicted in open condition. In this condition, the chamber 11.3 has decreased its volume due to the displacement of the elastomeric body 20.3 (which keeps its wall zone 24.3 collapsed). Depending on the flow actually being transferred through the port which defines the longitudinal groove 34.3 in the lower sealing means 46.3 the pressure in the chamber 11.3 may vary, and with this, the separation between the sealing zone 22.3 and the valve seat 8.3 may also vary, thus varying the opening and closing degree of the valve 1.3. This allows to command the opening, closing and adjustment of the valve with greater accuracy and lesser energy.

When the control valve 1.3 is totally or partially closed by applying an axial force which approaches the elastomeric body 20.3 to the valve seat 8.3 and which tends to close the port which defines the longitudinal groove 34.3 in the lower sealing means 46.3, a greater quantity of flow begins to enter from the flow inlet opening 4.3 through the central hole 28.3 and the longitudinal groove 34.3 to the chamber 11.3, this increasing its volume of flow and lowering the sealing zone 22.3 moving the same closer to the valve seat 8.3, thus reducing the section of free passage of flow from the inlet opening of flow 4.3 to the outlet opening of flow 6.3 until closing, if the driving end 42.3 is commanded to close.

Figure 11:
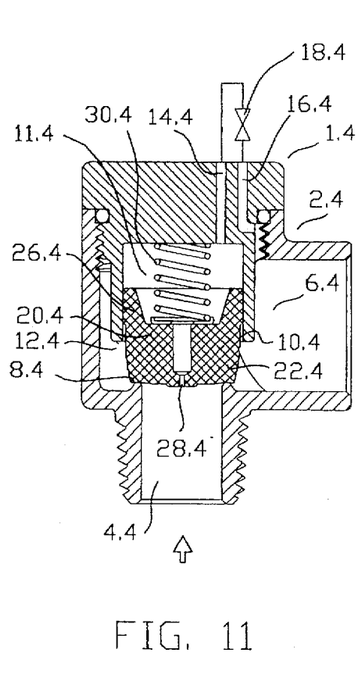
FIG. 11 shows a sectional elevational view of a sixth modality of the valve of the invention, in which it is closed.
Figure 12:
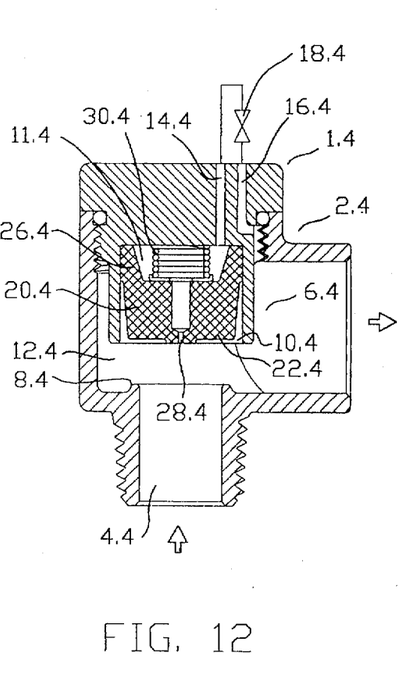
FIG. 12 is the same view as FIG. 11, but showing the valve opened.

FIGS. 11 and 12 depict a sixth modality of the invention in closed and open position, respectively. This modality, unlike the two previous ones, has an elastomeric body 20.4 made up of only two coaxial zones: one sealing zone 22.4 and a second zone of radial sealing 26.4, and also includes a compressing spring 30.4 inside the chamber 11.4, initially being lightly compressed between the upper surface of the sealing zone 22.4 and the upper surface of the main cavity 10.4 of the valve body 2.4.

The valve 1.4 which is made up of a valve body 2.4 having an inlet opening for the flow 4.4 and a flow outlet 6.4 which is oriented in a substantially cross way to said flow inlet 4.4.

The valve body 2.4 has a valve seat 8.4 inside said flow inlet 4.4. Between the flow inlet 4.4 and the flow outlet 6.4, the valve body 2.4 has a main cavity 10.4 of constant section, cylindrical preferably, which is coaxially oriented to the flow inlet 4.4. This main cavity 10.4 has a ring-shaped broadening 12.4 in the zone which communicates with the flow outlet 6.4 over valve seat 8.4. On the other hand, the main cavity 10.4 is communicated in its farthest zone to the flow outlet 4.4 with an inlet of the control flow 14.4. Additionally, the flow outlet 6.4 is communicated with one or more outlets of the control flow 16.4.

The valve of this sixth modality has flow transfer means which regulate small flows of control, which consist in a secondary or control valve 18.4 installed between the inlet of the control flow 14.4 and the outlet of the control flow 16.4. The secondary or control valve 18.4 may be any valve of the state of the art allowing a preset regulation of the flow between a minimum closed position and a preset maximum position (open).

In addition, the valve 1.4 includes an elastomeric body 20.4 with a constant cross section, cylindrical preferably, which is hollow and open in its upper base, the same being located inside the main cavity 10.4. This elastomeric body 20.4 is made up of two coaxial zones: a first sealing zone 22.4 and a second zone of radial zone 26.4.

The sealing zone 22.4 is located at the lower bottom of the elastomeric body 20.4 and is formed by a relatively thick mass body with a slightly lower section than the section of the main cavity 10.4 and with a slightly greater height than the ring-shaped broadening height 12.4 of said main cavity 10.4, so that this sealing zone 22.4 does not significantly collapse in the axial direction before the working pressures. The base of the sealing zone 22.4 has a central hole 28.4 allowing the transfer of flow from the inlet of the flow 4.4 to the main cavity 10.4 and vice versa. The lower surface of the sealing zone 22.4 has a slightly greater section than the section of the valve seat 8.4 and the upper surface of said zone has a section which is equal to or greater than its lower surface.

The zone of radial seal 26.4 acts on the side walls of the main cavity 10.4 and is forming the section of the open upper base of the elastomeric body 20.4. This zone of radial seal 26.4 is formed by portions of thick walls which do not significantly collapse in axial direction before working pressures, and its external surface has a similar geometry to that of the surface of the main cavity 10.4 in that sector, its section being tight to the section of the main cavity 10.4. The open end of the elastomeric body 20.4 is free to displace in the axial direction of the main cavity 10.4.

As already mentioned, the valve 1.4 has a compressing ring 30.4 located inside the elastomeric body 20.4 with one of the ends of the spring 30.4 in contact with the internal sealing zone 22.4 and with the other end of the spring in contact with the main cavity 10.4 of the valve body 2.4.

FIG. 11 depicts the valve 1.4 in closed condition. In this situation, the compressing ring 30.4 exerts a force downwards, thus compressing the sealing zone 22.4 against the valve seat 8.4 so that the whole elastomeric body 20.4 is displaced to the lower position of said main cavity 10.4 defining a chamber 11.4. Initially, when the line is without load, the single action of the spring 30.4 determines the closing of the valve.

When valve 1.4 is closed and the flow floods the inlet opening of the flow 4.4, the latter enters through the central hole 28.4 of the elastomeric body 20.4, also flooding the chamber 11.4, and because the section of said chamber 11.4 is greater than the section of the valve seat 8.4, the pressure of the flow exerts a resulting force which compresses the sealing zone 22.4 of the elastomeric body 20.4 against the valve seat 8.4, the sealing of the valve being thus increased. The flow also floods the inlet of the control flow 14.4, which tops out in the secondary or control valve 18.4, which, in this condition, is closed.

When the secondary or control valve 18.4 is opened, the flow which is held back by pressure in chamber 11.4 is discharged entering through the inlet of the control flow 14.4 going through said control valve 18.4 in order to be released through the outlet of the control flow 16.4 to the outlet opening of flow 6.4 due to the differences of pressure existing between chamber 11.4 and the outlet opening of flow 6.4. During this process of flow discharge from chamber 11.4, the pressure in said chamber is lower than the pressure in the inlet opening of flow 4.4, so that the flow found in said inlet 4.4 moves through the central hole 28.4 of the elastomeric body 20.4 to enter chamber 11.4, but this entry of flow does not get to increase the pressure in said chamber, since the control valve 18.4 is opened releasing the flow, and in this first moment the action of the spring 30.4 still keeps valve 1.4 in closed condition. However, the greater pressure of the flow in the external face of the sealing zone 22.4 of the elastomeric body 20.4 —which is exerted from the flow inlet opening 4.4—produces a resulting axial force which overcomes the action of the spring 30.4 and displaces the sealing zone 22.4, moving it away from the valve seat 8.4, compressing said spring 30.4, which is left exerting a greater restoring force in axial direction, which tends to overcome the force exerted by the flow pressure entering from the opening of the flow inlet 4.4. In this situation, with the elastomeric body 20.4 far from the valve seat 8.4, the flow is able now to freely move from the inlet opening of flow 4.4 to the outlet opening of the flow 6.4 as depicted in FIG. 12.

In FIG. 12 valve 1.4 of the sixth modality of the invention is depicted in open condition. In this condition, the chamber 11.4 has decreased its volume due to the displacement of the elastomeric body 20.4 and the spring 30.4 has been compressed. Depending on the flow which is transferred by the control valve 18.4, the pressure in the chamber 11.4 may change, and with this, the separation between the sealing zone 22.4 and the valve seat 8.4 may also vary, thus varying the opening and closing degree of the valve 1.4. This allows to command the opening, closing and adjustment of the valve with greater accuracy and lesser energy.

When the control valve 18.4 is totally or partially closed, a greater quantity of flow begins to enter from the flow inlet opening 4.4 through the central hole 28.4 to the chamber 11.4, this increasing its volume of flow and lowering the sealing zone 22.4 moving the same closer to the valve seat 8.4, thus reducing the section of free passage of flow from the inlet opening of flow 4.4 to the outlet opening of flow 6.4 until closing, if the control valve 18.4 is commanded to close.

Figure 13:
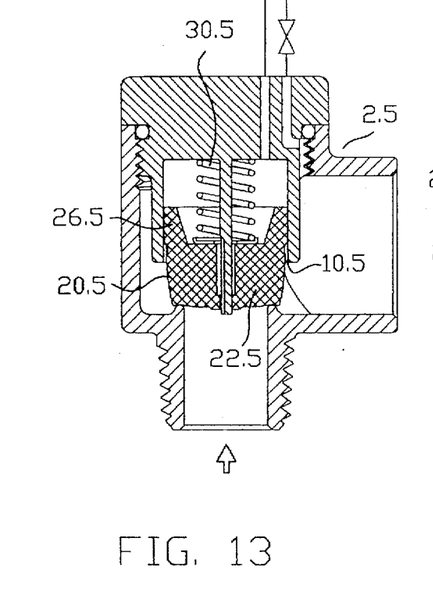
FIG. 13 shows a sectional elevational view of a seventh modality of the valve of the invention, in which it is closed.
Figure 14:
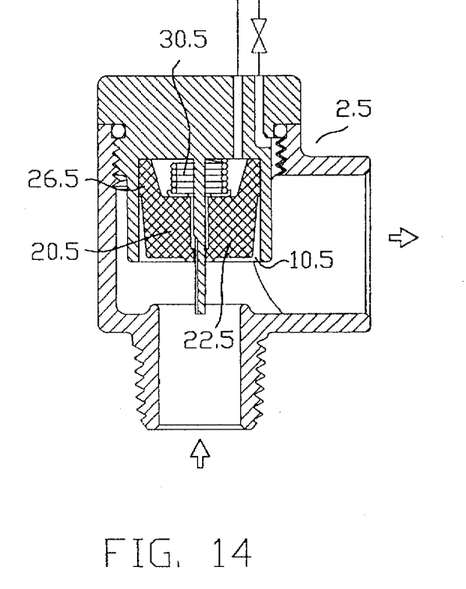
FIG. 14 is the same view as FIG. 13, but showing the valve opened.

FIGS. 13 and 14 depict a seventh modality of the invention in closed and open position, respectively. This modality is similar to the fourth modality as described in FIGS. 7 and 8, but the elastomeric body 20.5 is free to move in its two ends and is made up of only two coaxial zones: one first sealing zone 22.5 and a second zone of radial sealing 26.5, the compressing spring 30.4 being initially lightly compressed between the upper surface of the sealing zone 22.5 and the upper surface of the main cavity 10.5 of the valve body 2.5.

Figure 15:
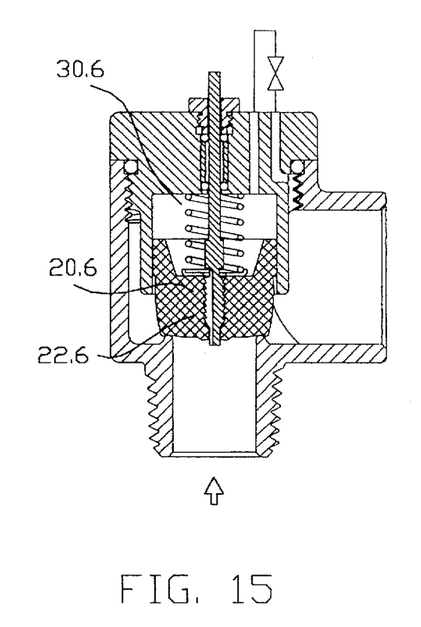
FIG. 15 shows a sectional elevational view of an eighth modality of the valve of the invention, in which it is closed.
Figure 16:
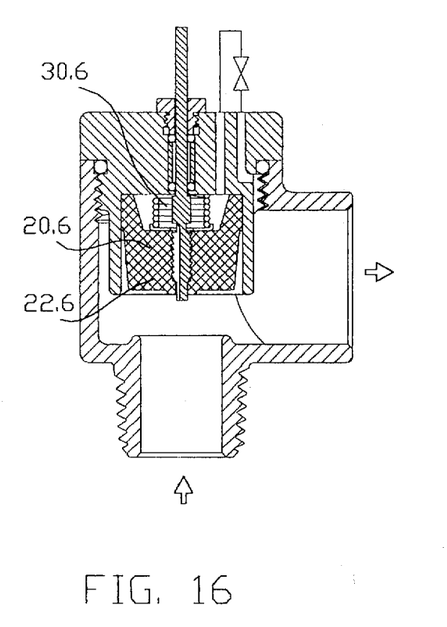
FIG. 16 is the same view as FIG. 15, but showing the valve opened.

FIGS. 15 and 16 depict an eighth modality of the invention in closed and open position, respectively. This modality is similar to the fifth modality as described in FIGS. 9 and 10, but the elastomeric body 20.6 is made up of only two coaxial zones: one first sealing zone 22.6 and a second zone of radial sealing 26.6, the compressing spring 30.6 being initially lightly compressed between the upper surface of the sealing zone 22.6 and the upper surface of the main cavity 10.6 of the valve body 2.6.

The invention has been described based on eight preferred modalities, in which different combinations of some of its components have been considered. In all modalities there is still an elastomeric body made up of at least two axial zones: one sealing zone in an end, and one zone of radial sealing in the other end, a zone of thin wall being able to exist which is intermediate to the other ones.

In case that the elastomeric body is made up of only two zones (a sealing one and a radial sealing), the spring shall be always present in order to contribute the necessary restoring forces to produce the sealing of the valve, when the pressure in the chamber is reduced. The spring also allows to reduce the negative effect of the water hammer produced in the line, thus reducing the flow leaks which, on the contrary, would be produced due to the sudden increase of the pressure which acts on the external surfaces of the elastomeric body subject to the flow entering.

When the zone of thin wall exists in the elastomeric body, there may be a compressing spring or not in the valve chamber, exerting a force which tends to compress the sealing zone against the valve seat. In this same case in which the elastomeric body is made up of three axial zones, this elastomeric body may be fixed to the valve body in its zone of radial sealing or free in its two ends.

In the cases in which the elastomeric body has it zone of radial sealing free, the internal surface of the zone of radial sealing may be cylindrical or prismatic, trunk-conical (or trunk-pyramid) or inverted trunk-conical (or inverted trunk-pyramid), depending on the fact that a pressure inside the chamber shall exert a resulting force which does not affect the displacement of the zone of radial sealing, or else that the resulting force displaces the zone of radial sealing upwards, or else that the resulting force displaces the zone of radial sealing downwards, respectively.

On the other hand, the valves of the invention may not have the axial stem as depicted in the versions one, two and six (FIGS. 1 and 2; FIGS. 3 and 4; and 2; FIGS. 3 and 4; and FIGS. 11 and 12, respectively); or else they may have an axial stem. This axial stem, provided with a longitudinal groove, may be fixed or mobile with respect to the valve body. In the modalities three and seven, valves with fixed stem were described, and in the modalities five and eight, valves with a mobile stem were described.

Another important alternative of the invention is presented by the transfer means of control flow. These transfer means may consist in a traditional secondary valve, which is applicable in the modalities without axial stem or with a fixed axial stem; or, in the case of the valve with mobile axial stem, said transfer means of control flow may consist whether in a traditional secondary valve or in the particular interaction between the zone of the mobile stem with longitudinal groove and a secondary, axial cavity of the valve body, as described in the fifth modality and as already referred to in the eighth modality.

In the case of the valves of the invention with mobile axial stem, and with transfer means of control flow made up of the interaction of the axial stem with its longitudinal groove, and of the secondary chamber of the valve body, the longitudinal groove of the axial mobile stem may have a variable cross section, so that when said axial stem is commanded by axially moving, the groove shall define ports in the inlet of the secondary chamber, which areas shall depend on the cross section of the longitudinal groove in that sector, thus allowing to control the transfer rate of control flow from the chamber of the valve to the secondary cavity.

An obvious variant of the invention may consist in providing the external perimetrical mantle of the sealing zone of the elastomeric body with a rigid material, such as, for example, a tight metallic ring, which shall avoid the increase of the section of said sealing zone, when the pressure in the chamber of the valve significantly increases.

Another obvious variant of the invention may consist in providing the central hole of the sealing zone of the elastomeric body with regulating means of the opening, such as a screw with a longitudinal groove of variable section in order to allow the modification of the flow rate which is entering from the flow inlet of the valve to the chamber of the same, thus changing the answer speed of the valve, or the sensitivity of the same before variable pressures of flow.

Still another obvious variant of the invention may consist in providing the wall zone of the elastomeric body with several sections of thin axial wall, thus a valve being obtained which allows great displacements of the sealing element in order to control great volumes of flow.

What I claim is:

1. A flow valve operated by flow transfer means which regulate small flows of control, comprising:

a) a valve body which has an inlet opening of the flow; a valve seat in the internal part of said flow inlet; a flow outlet oriented in a substantially cross way to said flow inlet; a main cavity of constant section, cylindrical preferably, arranged between said inlet and outlet of flow, coaxially oriented to the flow inlet; said main cavity having a ring-shaped broadening in the zone communicating with said flow outlet over the valve seat; said main cavity being in the farthest zone of the flow inlet, communicated with an inlet of control flow; the flow outlet being communicated with one or more outlets of the control flow;

b) an elastomeric body of constant cross section, cylindrical preferably, which is hollow and open in its upper base, being located inside said main cavity, being slightly compressed in axial direction, so that it exerts a force over the valve seat; the elastomeric body being made up of two coaxial zones, where:

i) a first sealing zone of said elastomeric body is located at the lower base of said elastomeric body, being formed by a relatively thick mass body with a slightly lower section than the section of the main cavity and with a slightly greater height than the ring-shaped broadening height of the main cavity, so that this zone does not significantly collapse in the axial direction before the working pressures; said lower base having a central hole allowing the transfer of flow from said inlet of the flow to said main cavity and vice versa; said lower surface of said first sealing zone having a slightly greater section than the section of the valve seat and the upper surface of said zone having a section which is equal to or greater than its lower surface;

ii) a second radial sealing zone of said elastomeric body, which acts on the side walls of said main cavity, being located in the section of the upper, open base of said elastomeric body, being made up of portions of thick wall that do not significantly collapse in axial direction before the working pressures; the external surface of said radial sealing zone being of a geometry which is similar to that of the surface of the main cavity; the open end of the elastomeric body being free to move in the axial direction of said main cavity;

c) a compressing spring located inside said elastomeric body, one of the ends of the spring being in contact with the internal wall of the first sealing zone, and the other end of the spring being in contact with the main cavity of the valve body.

2. A flow valve as that of claim 1, in which said flow transfer means which regulate small control flows consist in a secondary or control valve installed between said inlet of control flow and said outlet of control flow; said control valve being any valve which allows a predetermined regulation of flow between a minimum closed position and a predetermined maximum position.

3. A flow valve as that of claim 1, including:

a) flow transfer means which regulate small control flows, which consist in a secondary or control valve installed between said inlet of control flow and said outlet of control flow; said control valve being any valve which allows a predetermined regulation of flow between a minimum closed position and a predetermined maximum position;

b) an axial stem which is interlocked or anchored to said valve body; said axial stem having a longitudinal groove at least involving a section which is slightly greater than the thickness of the first sealing zone; said axial stem tightly going through the central hole of said lower base of the elastomeric body.

4. A flow valve as that of claim 1, including an axial stem which is interlocked or anchored to the first sealing zone of the elastomeric body; said axial stem having a longitudinal groove at least involving a section which is slightly greater than the thickness of the first sealing zone; said inlet of control flow facing the longitudinal projection of said groove of the axial stem, the end of said stem—opposing to its anchorage end—projecting beyond the elastomeric body and going through a hole located in the valve body, which has the traditional sealing means.

5. A flow valve as that of claim 4, in which the flow transfer means which regulate small control flows, consist of:

a) a secondary cavity located in an intermediate zone of said hole in the valve body from where said or more outlets of control flow originate;

b) lower and upper sealing means in said secondary cavity of the valve body, which adjust to said axial stem;

c) the groove itself of said axial stem, which extends up to a point immediately before the lower sealing means of said secondary cavity.

6. A flow valve as that of claim 4, in which said flow transfer means which regulate small control flows consist in a secondary or control valve installed between said inlet of control flow and said outlet of control flow; said control valve being any valve which allows a predetermined regulation of flow between a minimum closed position and a predetermined maximum position.

7. A flow valve operated by flow transfer means which regulate small flows of control, comprising:

a) a valve body which has an inlet opening of the flow; a valve seat in the internal part of said flow inlet; a flow outlet oriented in a substantially cross way to said flow inlet; a main cavity of constant section, cylindrical preferably, arranged between the inlet and outlet of flow, coaxially oriented to the flow inlet; said main cavity having a ring-shaped broadening in the zone communicating with said flow outlet over the valve seat; said main cavity being in the farthest zone of the flow inlet, communicated with an inlet of control flow; the flow outlet being communicated with one or more outlets of the control flow;

b) an elastomeric body of constant cross section, cylindrical preferably, which is hollow and open in its upper base, being located inside said main cavity, being slightly compressed in axial direction, so that it exerts a force over the valve seat; the elastomeric body being made up of three coaxial zones, where:

i) a first sealing zone is located at the lower base of said elastomeric body, being formed by a relatively thick mass body with a slightly lower section than the section of the main cavity and with a slightly greater height than the ring-shaped broadening height of the main cavity, so that this zone does not significantly collapse in the axial direction before the working pressures; said lower base having a central hole allowing the transfer of flow from said inlet of the flow to said main cavity and vice versa; said lower surface of said first sealing zone having a slightly greater section than the section of the valve seat and the upper surface of said zone having a section which is equal to or greater than its lower surface;

ii) a second wall zone of said elastomeric body is located in the intermediate section of the mantle of said elastomeric body, being made up of a portion of wall which is relatively thin and of a section which is inferior to the section of the main cavity, being liable to become buckled and transmit axial stresses before the pressures exercised inside said main cavity;

iii) a third radial seal zone of said elastomeric body, which acts on the side walls of the main cavity, being located in the section of the upper, open base of said elastomeric body, being made up of portions of walls of a greater thickness than said second zone of wall, which external surface is of a geometry which is similar to that of the surface of the main cavity in that sector and its section is tight to the section of said main cavity.

8. A flow valve as that of claim 7, in which said flow transfer means which regulate small control flows consist in a secondary or control valve installed between said inlet of control flow and said outlet of control flow; said control valve being any valve which allows a predetermined regulation of flow between a minimum closed position and a predetermined maximum position.

9. A flow valve as that of claim 8, in which the end of the radial sealing zone of the elastomeric body is anchored to the wall of the main cavity of the valve body.

10. A flow valve as that of claim 8, in which the end of the radial sealing zone of the elastomeric body is free to move in the axial direction of said main cavity.

11. A flow valve as that of claim 8, including a compressing ring located inside said elastomeric body, one of the ends of the spring being in contact with the internal wall of the first sealing zone and the other end of the spring being in contact with the main cavity of the valve body.

12. A flow valve as that of claim 11, in which the end of the radial sealing zone of the elastomeric body is anchored to the wall of the main cavity of the valve body.

13. A flow valve as that of claim 11, in which the end of the radial sealing zone of the elastomeric body is free to move in the axial direction of said main cavity.

14. A flow valve as that of claim 7, including:

a) flow transfer means which regulate small control flows, which consist in a secondary or control valve installed between said inlet of control flow and said outlet of control flow; said control valve being any valve which allows a predetermined regulation of flow between a minimum closed position and a predetermined maximum position;

b) an axial stem which is interlocked or anchored to said valve body; said axial stem having a longitudinal groove at least involving a section which is slightly greater than the thickness of the first sealing zone; said axial stem tightly going through the central hole of said lower base of the elastomeric body.

15. A flow valve as that of claim 14, in which the end of the radial sealing zone of the elastomeric body is anchored to the wall of the main cavity of the valve body.

16. A flow valve as that of claim 14, in which the end of the radial sealing zone of the elastomeric body is free to move in the axial direction of said main cavity.

17. A flow valve as that of claim 14, including a compressing spring located inside said elastomeric body, one of the ends of the spring being in contact with the internal wall of the first sealing zone, and the other end of the spring being in contact with the main cavity of the valve body.

18. A flow valve as that of claim 17, in which the end of the radial sealing zone of the elastomeric body is anchored to the wall of the main cavity of the valve body.

19. A flow valve as that of claim 17, in which the end of the radial sealing zone of the elastomeric body is free to move in the axial direction of said main cavity.

20. A flow valve as that of claim 7 including an axial stem which is interlocked or anchored in one of its ends to the first sealing zone of the elastomeric body; said axial stem having a longitudinal groove at least involving a section which is slightly greater than the thickness of the first sealing zone; said inlet of control flow facing the longitudinal projection of said groove of the axial stem; the free end of said stem projecting beyond the elastomeric body and going through a hole located in the valve body, which has the traditional sealing means.

21. A flow valve as that of claim 20, in which the flow transfer means which regulate small control flows, consist of:

a) a secondary cavity located in an intermediate zone of said hole in the valve body from where said or more outlets of control flow originate;

b) lower and upper sealing means in said secondary cavity of the valve body, which adjust to said axial stem;

c) the groove itself of said axial stem, which extends up to a point immediately before the lower sealing means of said secondary cavity.

22. A flow valve as that of claim 21, in which the end of the radial sealing zone of the elastomeric body is anchored to the wall of the main cavity of the valve body.

23. A flow valve as that of claim 21, in which the end of the radial sealing zone of the elastomeric body is free to move in the axial direction of said main cavity.

24. A flow valve as that of claim 21, including a compressing spring located inside said elastomeric body, one of the ends of the spring being in contact with the internal wall of the first sealing zone, and the other end of the spring being in contact with the main cavity of the valve body.

25. A flow valve as that of claim 24, in which the end of the radial sealing zone of the elastomeric body is anchored to the wall of the main cavity of the valve body.

26. A flow valve as that of claim 24, in which the end of the radial sealing zone of the elastomeric body is free to move in the axial direction of said main cavity.

27. A flow valve as that of claim 20, in which said flow transfer means which regulate small control flows, consist in a secondary or control valve installed between said inlet of control flow and said outlet of control flow; said control valve being any valve which allows a predetermined regulation of flow between a minimum closed position and a predetermined maximum position.

28. A flow valve as that of claim 27, in which the end of the radial sealing zone of the elastomeric body is anchored to the wall of the main cavity of the valve body.

29. A flow valve as that of claim 27, in which the end of the radial sealing zone of the elastomeric body is free to move in the axial direction of said main cavity.

30. A flow valve as that of claim 27, including a compressing spring located inside said elastomeric body, one of the ends of the spring being in contact with the internal wall of the first sealing zone, and the other end of the spring being in contact with the main cavity of the valve body.

31. A flow valve as that of claim 30, in which the end of the radial sealing zone of the elastomeric body is anchored to the wall of the main cavity of the valve body.

32. A flow valve as that of claim 30, in which the end of the radial sealing zone of the elastomeric body is free to move in the axial direction of said main cavity.

* * * * *